May 1, 1923.
F. R. STEVENS
1,453,532
STEAM ENGINE VALVE REVERSING GEAR
Filed Jan. 2, 1923
2 Sheets-Sheet 2
– FIG. 2 –
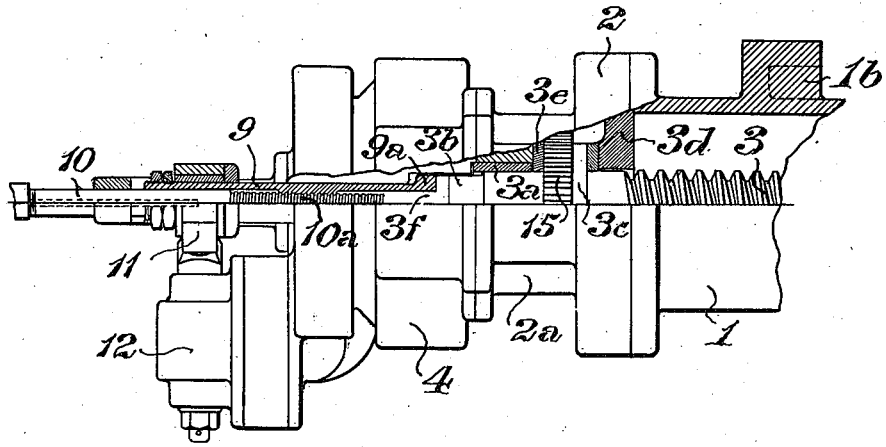
– FIG. 3 –
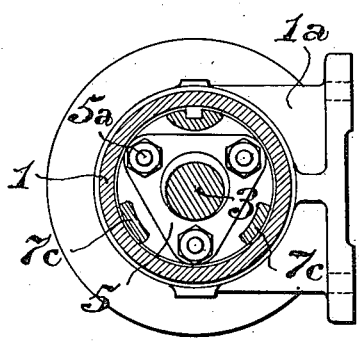
– FIG. 4 –
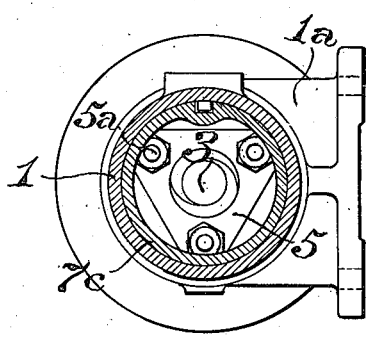

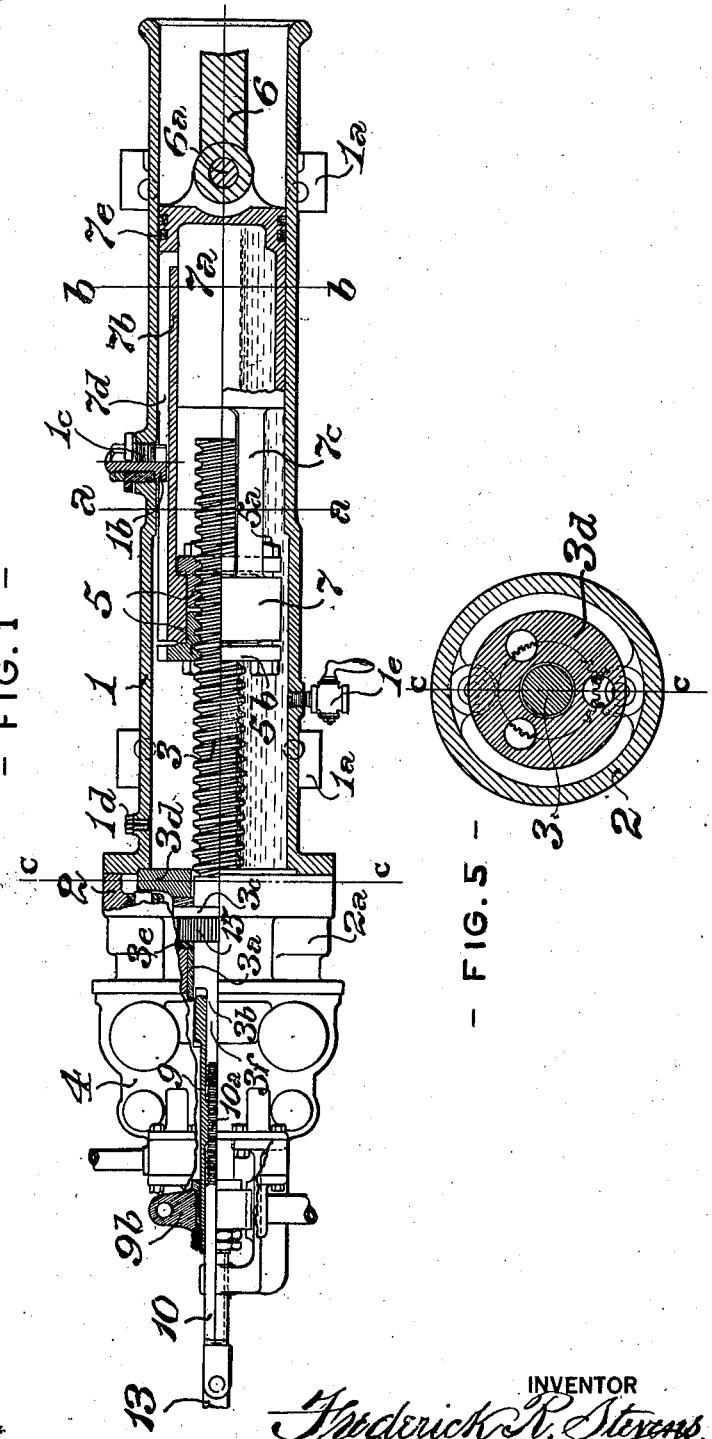

Patented May 1, 1923.

1,453,532

UNITED STATES PATENT OFFICE.

FREDERICK R. STEVENS, OF SCHENECTADY, NEW YORK.

STEAM-ENGINE-VALVE-REVERSING GEAR.

Application filed January 2, 1923. Serial No. 610,232.

*To all whom it may concern:*

Be it known that I, FREDERICK R. STEVENS, of Schenectady, in the county of Schenectady and State of New York, have invented a certain new and useful Improvement in Steam - Engine - Valve - Reversing Gears, of which improvement the following is a specification.

My invention relates to power actuated mechanism for reversing the valves of steam engines, of the class or type in which the desired movements of the valve gear are transmitted thereto, from the motor, through the intermediation of a screw and nut. The object of my invention is to provide a mechanism of such type which shall be of simple and inexpensive construction, and in the operation of which torque and side thrust will be eliminated, direct straight transmission of actuating power be effected, complete protection of the screw and nut from dirt and grit afforded, and ample area of guide bearing and easy oiling facilities provided.

The improvement claimed is hereinafter fully set forth.

In the accompanying drawings: Figure 1 is a view, partly in elevation and partly in longitudinal central section, of a steam engine valve reversing gear, illustrating an embodiment of my invention; Fig. 2, a similar view, taken at a right angle to Fig. 1, and on a larger scale, of the left hand portion thereof, and; Figs. 3, 4 and 5, vertical transverse sections, on the lines $a\ a$, $b\ b$ and $c\ c$, respectively, of Fig. 1.

In the practice of my invention, referring descriptively to the specific embodiment thereof which is herein exemplified, I provide a cylinder, 1, having lateral brackets, $1^a$, $1^a$, on one side of its axis, for attachment to a suitable support. The rear end of the cylinder is closed by a head, 2, which is formed integral with a rearwardly projecting motor support, $2^a$.

A screw, 3, is journalled, in line axially with the cylinder, in a thrust bearing, $3^a$, in the motor support, $2^a$, being held, as against longitudinal movement by a collar, $3^c$, formed or fixed upon it, and abutting against a thrust member, $3^d$, which is secured in the cylinder 1, and receives the forward thrust of the screw. The backward thrust thereof is received by the motor support, through the intermediation of thrust washers, $3^e$. The screw is adapted to be rotated by a motor, 4, of any suitable and preferred construction, to the shaft of which it is connected by a gear, 15, engaging pinions, $15^a$, rotated by the motor. The motor, which does not, in and of itself, form part of my invention, is rigidly secured to the motor support, $2^a$. The screw, 3, is engaged by a nut, 5, which is made in two sections, connected by bolts, $5^a$, and nuts, between which sections, liners may be interposed to permit adjustment for wear, and a cover plate, $5^b$, is secured to a housing, 7, hereinafter specified. The heads of the nut sections are of triangular form, as shown in Figs. 3 and 4, so as to enable them to be readily assembled between the ribs of the connecting member, hereinafter described, and rigidly secured in operation.

The nut, 5, which, in the rotation of the screw, 3, in either direction, traverses longitudinally thereon, is coupled to the reach rod, 6, which correspondingly moves the valve gear, (not shown), through the intermediation of a pin, $6^a$, and an integral connecting member, comprising a nut housing, 7, located at its rear end, in which housing the nut is secured to prevent it from turning, by a key; a cross head, $7^a$, at its forward end having lugs to which the reach rod is articulated by the pin, $6^a$; a sleeve, $7^b$, extending rearwardly from the cross head, and turned to a neat fit in the cylinder, 1; and a plurality of ribs, $7^c$, connecting the sleeve to the nut housing, 7. The connecting member provides a long and ample bearing, which completely eliminates any angular thrust on the screw, 3. A key way, $7^d$, which is cut in the top of the sleeve, $7^b$, is engaged by a key, $1^b$, fixed in the cylinder, 1, the sleeve being thereby prevented from turning in the cylinder. The key, $1^b$, is fitted in a sleeve, $1^c$, which is screwed into the cylinder, 1, so as to be readily removable therefrom when desired, without removing the connecting member from the cylinder, which construction materially facilitates assembly and minor adjustments of the gear.

A filling hole is formed in the top of the cylinder, 1, and is closed by a plug, $1^d$, which is perforated by a small air vent, to permit free circulation of air when the reverse gear is operated, and an oil drain cock, $1^e$, is connected to the bottom of the cylinder, to permit oil to be drained off when desired.

The manually operated motor control mechanism which is herein exemplified, does not, in and of itself, form part of my present invention, being similar, in all essential particulars, to that set forth in Letters Patent of the United States No. 1,431,992, granted and issued to me under date of October 17, 1922, to which reference may be had for a detailed description. As in said Letters Patent, a motor controlling valve is fitted in a casing, 12, secured to the motor casing, and is manually operated, as desired, by a rod, 13, connected to the ordinary reverse lever in the cab, said rod being coupled to an arm, 11, connected to the controlling valve and having a screw thread, 10$^a$, on its inner end, engaging a sliding sleeve, 9, which is, in turn, engaged with the screw, 3.

The novel features which are characteristic of my invention, and of substantial importance and value in practice, may be summarized as follows: (a), a cylinder which completely encloses the screw by which movement is imparted to the reach rod, so as to protect it from the access of dirt and grit; (b), the rectilinear disposition of all working members thereby minimizing angular thrust; (c), the provision of a connecting member having a long bearing in the enclosing cylinder which eliminates torque in the screw; and, (d), the construction of the cylinder and connecting member in such relation to the screw as to enable it to be continuously operated in a bath of oil.

In the operation of the appliance, the operator causes the reach rod to be moved, by the traverse of the nut and connecting member, effected by the rotation of the screw by the motor, to the position corresponding to the desired adjustment of the valve gear, and thereupon engages the hand reverse lever with the proper notch of its segment. The movement of the members is then automatically stopped, by the closure of the actuating valve of the motor, through the connecting means above described.

I claim as my invention and desire to secure by Letters Patent:

1. In a steam engine valve reversing gear, the combination of a cylinder, closed at one end; a screw rotatable therein; a connecting member, fitting in said cylinder and effecting closure of the opposite end thereof, and adapted to be coupled to a reach rod; and a nut, fixed in said connecting member and engaged by the screw.

2. In a steam engine valve reversing gear, the combination of an enclosing cylinder; a head, closing one end thereof; a screw, rotatable therein; a connecting member, comprising a cross head at one end, fitting in, and closing the adjacent end of, the enclosing cylinder, and adapted to be coupled to a reach rod, a nut housing at the opposite end, also fitting in the cylinder, and intermediate connecting ribs; and a nut, fixed adjustably in the nut housing and engaged by the screw.

3. In a steam engine valve reversing gear, the combination of an enclosing cylinder; a head, closing one end thereof; a screw, rotatable therein, in line axially therewith; a connecting member, fitting in said cylinder and effecting closure of one end thereof; means for coupling a reach rod to said member, in line axially with the cylinder; and a nut, fixed in the connecting member and engaged by the screw.

4. In a steam engine valve reversing gear, the combination of an enclosing cylinder; a head, closing one end thereof; a connecting member, movable therein, and effecting closure of the opposite end thereof; a screw, rotatable in the cylinder; a nut, fixed in the connecting member and engaged by the screw; means for coupling a reach rod to the connecting member; and means for supplying oil to, and withdrawing it from, the enclosing cylinder.

5. In a steam engine valve reversing gear, the combination of an enclosing cylinder; a head, closing one end thereof; a screw, rotatable therein; a connecting member, fitting therein and effecting closure of one end thereof; a nut, fixed in said connecting member and engaged by the screw; means for coupling a reach rod to the connecting member; and a motor, connected to the cylinder head, and geared to the screw.

6. In a steam engine valve reversing gear, the combination of a connecting member, having a nut housing at one end, a closed ended cross head at the other end, and intermediate connecting ribs; and a two part nut, secured adjustably in the nut housing, and having an angular head, insertible and removable between the ribs of the connecting member.

FREDERICK R. STEVENS.

Witnesses:
 BURTON B. MILLS,
 JOHN L. STEELE.